United States Patent
Teshima et al.

(10) Patent No.: US 8,408,597 B2
(45) Date of Patent: Apr. 2, 2013

(54) AIRBAG AND AIRBAG DEVICE

(75) Inventors: Yoji Teshima, Settsu (JP); Kazuo Obata, Settsu (JP); Mineatsu Misaka, Settsu (JP)

(73) Assignee: Ashimori Industry Co., Ltd., Osaka (JP)

( * ) Notice: Subject to any disclaimer, the term of this patent is extended or adjusted under 35 U.S.C. 154(b) by 138 days.

(21) Appl. No.: 12/989,356

(22) PCT Filed: Apr. 15, 2009

(86) PCT No.: PCT/JP2009/057593
§ 371 (c)(1),
(2), (4) Date: Dec. 27, 2010

(87) PCT Pub. No.: WO2009/131045
PCT Pub. Date: Oct. 29, 2009

(65) Prior Publication Data
US 2011/0115203 A1  May 19, 2011

(30) Foreign Application Priority Data
Apr. 23, 2008 (JP) .................................. 2008-112865

(51) Int. Cl.
*B60R 21/231* (2006.01)
(52) U.S. Cl. .................................. 280/743.1; 280/730.2
(58) Field of Classification Search ............... 280/730.2, 280/743.1
See application file for complete search history.

(56) References Cited

U.S. PATENT DOCUMENTS

| 6,293,581 B1 | 9/2001 | Saita et al. | |
|---|---|---|---|
| 2001/0026062 A1 * | 10/2001 | Kosugi et al. | ............... 280/730.2 |
| 2004/0070184 A1 | 4/2004 | Takahara | |

FOREIGN PATENT DOCUMENTS

| JP | 2000-127885 A | | 5/2000 |
|---|---|---|---|
| JP | 2000-296749 A | | 10/2000 |
| JP | 2001-1854 A | * | 1/2001 |
| JP | 2001-277971 A | | 10/2001 |
| JP | 2002-255008 A | | 9/2002 |
| JP | 2002-326552 A | | 11/2002 |
| JP | 2003-205817 A | | 7/2003 |

* cited by examiner

*Primary Examiner* — Ruth Ilan
(74) *Attorney, Agent, or Firm* — Sughrue Mion, PLLC

(57) ABSTRACT

A sewing thread of a sewn portion provided in an air chamber of an airbag is prevented from being cut during manufacturing, and damage to the airbag starting from an end of the sewn portion is suppressed. An inner connecting portion (30) provided in an air chamber of an airbag, at which opposing base fabrics are connected to each other, is formed of a first sewn portion (31) formed by sewing the base fabrics together so as to divide the air chamber, a second sewn portion (32) that surrounds an end (31T) of the first sewn portion (31) to protect it, and an adhesive layer (35) formed around the sewn portions (31) and (32). Ends (32T) of the second sewn portion (32) disposed on both sides of the first sewn portion (31) are formed such that they are continuously sewn toward an inner region (R) of the second sewn portion (32) along the end (31T) at a predetermined distance therefrom, such that they project further than the end (31T) of the first sewn portion (31), without intersecting the first sewn portion (31).

20 Claims, 3 Drawing Sheets

AIRBAG AND AIRBAG DEVICE

CROSS REFERENCE TO RELATED APPLICATIONS

This application is a National Stage of International Application No. PCT/JP2009/057593, filed on Apr. 15, 2009, which claims priority from Japanese Patent Application No. 2008-112865, filed on Apr. 23, 2008, the contents of all of which are incorporated herein by reference in their entirety.

TECHNICAL FIELD

The present invention relates to airbags and airbag devices installed in vehicles, such as cars. In particular, it relates to an airbag in which opposing base fabrics are connected at a connecting portion provided in an air chamber, thereby dividing the air chamber, and to an airbag device having such an airbag.

BACKGROUND ART

In order to protect an occupant in the driver's seat or the passenger seat of a vehicle in a collision or an emergency, cars having an airbag device that has an inflatable and deployable airbag and is installed in, for example, the steering wheel or the instrument panel are widely used. Furthermore, in recent years, in order to further enhance the function of protecting an occupant, including an occupant seated in the rear seat, a side-surface airbag device that deploys an airbag in a curtain-like manner along an inner side wall window of the vehicle, between the window and the occupant, so as to cover the entirety thereof, is employed.

Meanwhile, there is conventionally known an airbag having a stitched portion (sewn portion), at which base fabrics are sewn together, in an air chamber formed between opposing base fabrics to restrict the shape of the deployed airbag to a flat shape (see PTL 1).

In this conventional airbag, the sewn portion is formed of a connecting portion having a line shape, which connects the base fabrics together, and circular protective connecting portions surrounding ends of the connecting portion to connect the base fabrics to each other. The protective connecting portions protect the ends of the connecting portion while reducing the concentration of force on the ends.

However, in this conventional airbag, because the sewing lines of these connecting portions intersect each other, when the stitches overlap each other during sewing, the previously sewn sewing thread may be cut. As a result, the strength of the intersection of the connecting portions against a force pulling the base fabrics apart from each other during inflation and deployment decreases. Furthermore, that force acts on the intersection (cut end) of the sewing threads, making the connecting portion likely to break from that portion, whereby part of the inflating and deploying airbag may be damaged.

Furthermore, this airbag has a problem in that, because the intersection of the sewing threads has low flexibility and, hence, the reaction force acting in the vicinity thereof when the airbag is folded is large, it is difficult to fold the airbag in a compact form precisely. In particular, in this airbag, the connecting portions are each formed of two sewing lines and are disposed close to each other, and the number of intersections is large. This partially further decreases the flexibility of the airbag, making it more difficult to fold the airbag. In addition, there is another problem in that the sewing is difficult because the ends of the connecting portion are folded back in the opposite direction and are double stitched for reinforcement, and because the ends of the protective connecting portions are sewn so as not to overlap but to be slightly shifted from each other.

CITATION LIST

Patent Literature

PTL 1: The Publication of Japanese Patent No. 3715902

SUMMARY OF INVENTION

Technical Problem

The present invention has been made in view of the above-described conventional problems, and objects thereof are to prevent a sewing thread of a sewn portion provided in an air chamber of an airbag from being cut during sewing, to suppress damage to the airbag starting from ends of the sewn portion, and to facilitate sewing while maintaining the flexibility of the airbag.

Solution to Problem

The present invention is an airbag including an inflatable air chamber formed between opposing base fabrics; and a connecting portion formed in the air chamber, the connecting portion connecting the opposing base fabrics to each other. The connecting portion includes a first sewn portion that divides the air chamber formed by sewing the base fabrics together and a second sewn portion surrounding an end of the first sewn portion. Ends of the second sewn portion disposed on both sides of the first sewn portion are continuously sewn toward the inner side, along the end of the first sewn portion, without intersecting the first sewn portion.

Furthermore, the present invention is an airbag device including the above-described airbag and an inflator that supplies gas to the airbag.

Advantageous Effects of Invention

According to the present invention, it is possible to prevent a sewing thread of a sewn portion provided in an air chamber of an airbag from being cut during sewing, to suppress damage to the airbag starting from ends of the sewn portion, and to facilitate sewing while maintaining the flexibility of the airbag.

DESCRIPTION OF EMBODIMENTS

An embodiment of an airbag device according to the present invention will be described with reference to the drawings.

This airbag device is an airbag device for, for example, the driver's seat, the passenger seat, or a side of a car and includes an inflatable and deployable airbag and an inflator that generates and supplies gas to the airbag in an emergency of a vehicle or when an impact is detected. Furthermore, the following embodiment will be described taking a side airbag device as an example, in which the airbag is inflated and deployed in a curtain-like manner from an upper side portion of a vehicle and is deployed in a predetermined area of an inner side of the vehicle from the driver's seat or the passenger seat to the rear seat in the rear of the vehicle, thereby protecting mainly the head of an occupant in the front seat or the rear seat.

Figure 1:
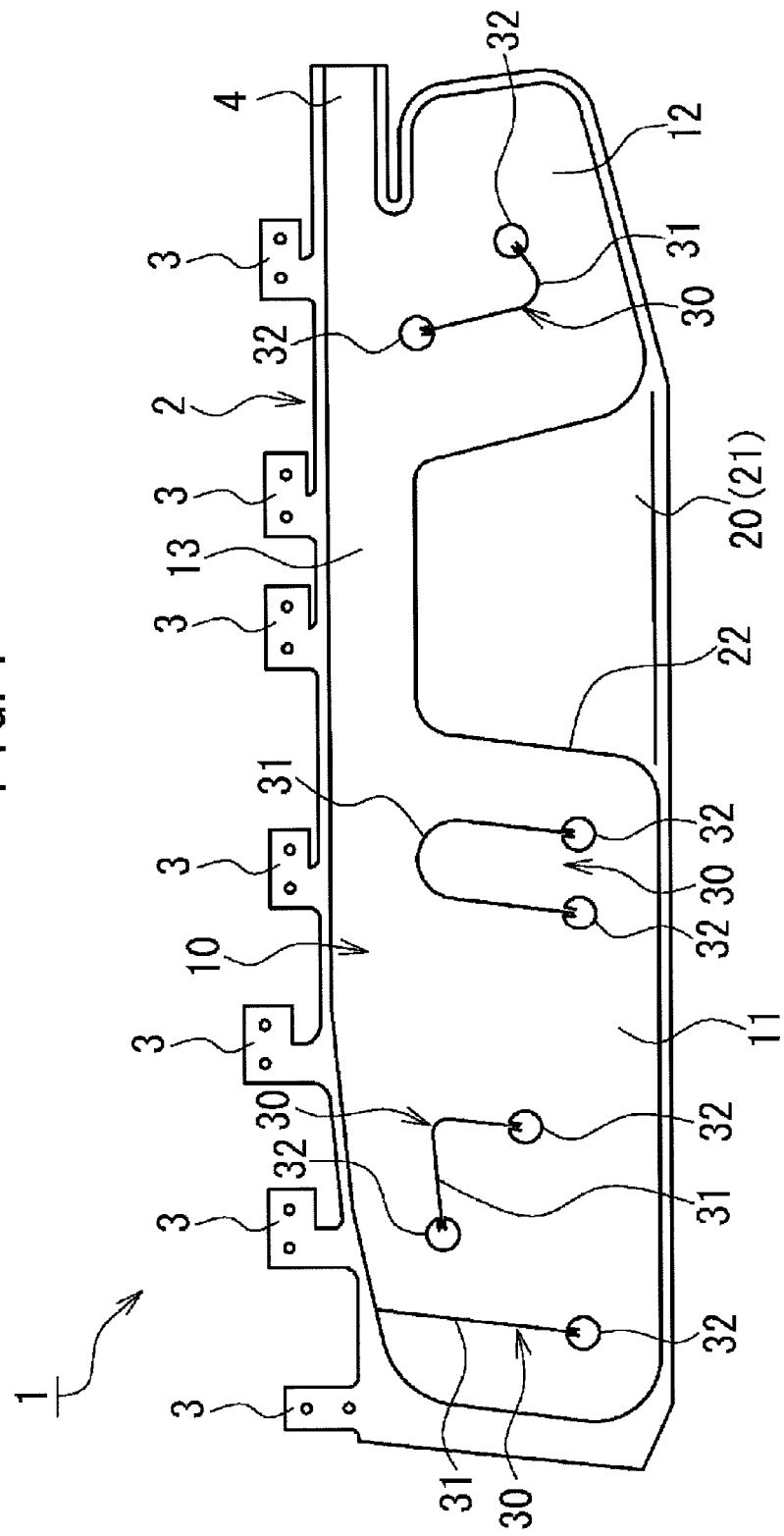
FIG. 1 is a schematic front view showing the relevant part of an airbag of an airbag device according to this embodiment.

FIG. 1 is a schematic front view showing the relevant part of an airbag of an airbag device according to this embodiment, and is a developed schematic plan view showing the shape of the deployed airbag.

In FIG. 1, the side of a gas inlet 4 (described below) (on the right side of an oblong airbag 2 in the figure), to which an inflator (not shown) is attached, is the rear side (rear pillar side) of a vehicle, and the opposite side (on the left side of the airbag 2 in the figure) is the front side (front pillar side) of the vehicle. Furthermore, in the airbag device 1 according to this embodiment, the airbag 2 is disposed and stored in a roof rail portion or the like (not shown) at an upper side portion of the vehicle (above the airbag 2 in the figure), and is inflated and deployed in a curtain-like manner, by the introduction of the gas, to the lower side of the vehicle from the stored state. Thus, the airbag 2 is inflated and deployed along an inner side wall of the vehicle, including a side window of the vehicle (located on the far side of the plane of paper in the figure) (not shown), so as to cover the entirety thereof and is inflated and deployed between the occupant and the side wall or the like.

As shown in the figure, the airbag 2 has an oblong, substantially bag-like shape conforming to the shape of the window in the inner side wall of the vehicle to be covered and has a plurality of (seven in the figure) substantially rectangular attaching tabs 3, along the upper edge of the airbag 2. The attaching tab 3 is attached to the roof rail portion of the vehicle. Furthermore, the airbag 2, before being inflated, is stored and disposed in a trim (airbag cover) provided at several positions of the vehicle, such that each attaching tab 3 is fixed and attached to a predetermined position of the vehicle with a bolt. At this time, the airbag 2 is stored so that it can be inflated and deployed mainly downward, by being sequentially folded toward the attaching tab 3 (toward the upper edge) or being rolled up from the lower edge to the upper edge toward the vehicle's exterior side.

Accordingly, the airbag device 1 includes other configurations similar to those of the conventional airbag devices, such as a trim that accommodate the airbag 2 or the like attached to the vehicle in a predetermined state and that covers the vehicle's interior side while the airbag 2 is not operated, the trim being attached to the roof rail portion or the like along the storage position; the inflator that supplies gas to the folded airbag 2, thereby inflating and deploying the airbag 2 from the inside of the trim to the lower side of the vehicle in an emergency or the like of the vehicle; and fixing means that fixes the airbag 2 and the inflator to the vehicle (all of the aforementioned are not shown). When the inflator is activated in this state, the stored airbag 2 is inflated and push-opens the trim and, from there, is inflated and deployed in a curtain-like manner mainly to the lower side of the vehicle.

This airbag 2 is formed in a substantially bag-like shape by connecting opposing base fabrics to each other in an airtight manner at a predetermined position by, for example, layering two base fabrics having the same shape, formed by cutting a woven fabric, or folding a single base fabric having a substantially symmetric shape and then sewing or bonding them together along the edge, thereby forming an inflatable air chamber (cell) 10 therebetween.

In this embodiment, the airbag 2 is formed of a front-side base fabric 20 on the occupant side and a rear-side base fabric 21 at the inner side wall of the vehicle, the base fabrics 20 and 21 being symmetrical to each other (herein, an oblong, substantially rectangular shape). The opposing base fabrics 20 and 21 are layered and connected to each other along an outer peripheral connecting portion 22. This outer peripheral connecting portion 22 divides the inside and outside of the airbag 2 and defines the outer peripheral shape of the air chamber 10. The outer peripheral connecting portion 22 is formed by sewing the base fabrics 20 and 21 together once or several times along the position corresponding to the outer periphery of the air chamber 10 to be formed. Thus, the air chamber 10 is formed into a bag-like shape extending continuously in the front-rear direction of the vehicle, the air chamber 10 including a front air chamber 11 having a substantially rectangular shape in plan view for mainly protecting an occupant in the front seat, a rear air chamber 12 smaller than the front air chamber 11, having a substantially rectangular shape in plan view for mainly protecting an occupant in the rear seat, and a connecting portion 13 connecting the upper portions of the air chambers 11 and 12. Note that the connecting portion 13 is formed such that it is narrower, i.e., has a smaller top-bottom dimension, than the air chambers 11 and 12 and is disposed linearly between the air chambers 11 and 12 so as to extend along the upper edge of the airbag 2.

Furthermore, in this airbag 2, the base fabrics 20 and 21 are projected outward at an upper portion of one end (herein, on the rear side of the vehicle), and a portion at which the base fabrics 20 and 21 are not connected to each other is provided between ends of the outer peripheral connecting portion 22 that connects these base fabrics 20 and 21, thereby forming the substantially tubular gas inlet 4. That is, the gas inlet 4 is an opening at which a part of the rear air chamber 12 is open to the outside of the airbag 2 and the inside and outside of the air chamber 10 communicate with each other, and it serves as a gas supply port (flow-in port) that allows the gas from the inflator to be introduced into the airbag 2 and to be supplied and flowed into the air chamber 10.

In the airbag device 1, one end (gas discharge port) of the substantially tubular cylinder-type inflator is inserted into the gas inlet 4 with, for example, a gas-guiding member or a gas-rectifying member interposed therebetween, and they are fixed together using a clamp (band) (not shown) fastened from the outside. Thus, the inflator is attached to the gas inlet 4 in an air-tight manner, allowing the gas generated by the inflator to be introduced from the gas inlet 4, to be supplied into the air chamber 10 of the airbag 2, and to flow into the rear air chamber 12. Furthermore, the gas is allowed to flow into the front air chamber 11 from the connecting portion 13, thereby supplying the gas to the entire air chamber 10 and inflating and deploying the airbag 2.

Furthermore, in the airbag 2, the opposing base fabrics 20 and 21 are connected to each other also at a connecting portion (inner connecting portion) 30 provided in the air chamber 10, and each of the air chambers 11 and 12 is defined at least on both side of the inner connecting portion 30. The inner connecting portion 30 serves as a partition wall that forms gas flow path and inflation portion inside the air chamber 10 and serves to suppress the inflation of the air chambers 11 and 12 in the thickness direction (in the figure, the direction perpendicular to the plane of paper) to restrict the inflation thickness and the deployment shape. The inner connecting portion 30 is formed in a predetermined shape according to the purpose, and one or a plurality of inner connecting portions 30 may be disposed at a predetermined position in the air chamber 10. Herein, in the front air chamber 11, three inner connecting portions 30, namely, sequentially from the connecting portion 13 side, one having a substantially inverted U-shape, one having a substantially L-shape, and one having a straight-line shape extending vertically, are disposed at a distance from one another in the lateral direction. On the other hand, in the rear air chamber 12, one inner connecting portion 30 having a substantially L-shape is disposed at the center.

Herein, although the base fabrics 20 and 21 may be non-coated base fabrics, they may be coated base fabrics having coating layers composed of resin or rubber having heat resistance and airtightness. In such a case, the base fabrics 20 and 21 are connected to each other such that the surfaces having coating layers face each other. Furthermore, in this airbag device 1, the connecting portions 22 and 30 are each formed of an adhesive layer at which the base fabrics 20 and 21 are bonded to each other with an adhesive and a sewn portion at which the base fabrics 20 and 21 are sewn together, the sewn portion being provided in the adhesive layer. That is, the base fabrics 20 and 21 are connected to each other with an adhesive and by sewing. Moreover, the base fabrics 20 and 21 are connected to each other in a substantially circular shape so as to surround a predetermined area at the end of each inner connecting portion 30 terminated in the air chamber 10. This increases the strength in the vicinity of the end of the inner connecting portion 30 and prevents damage thereto.

Figure 2:
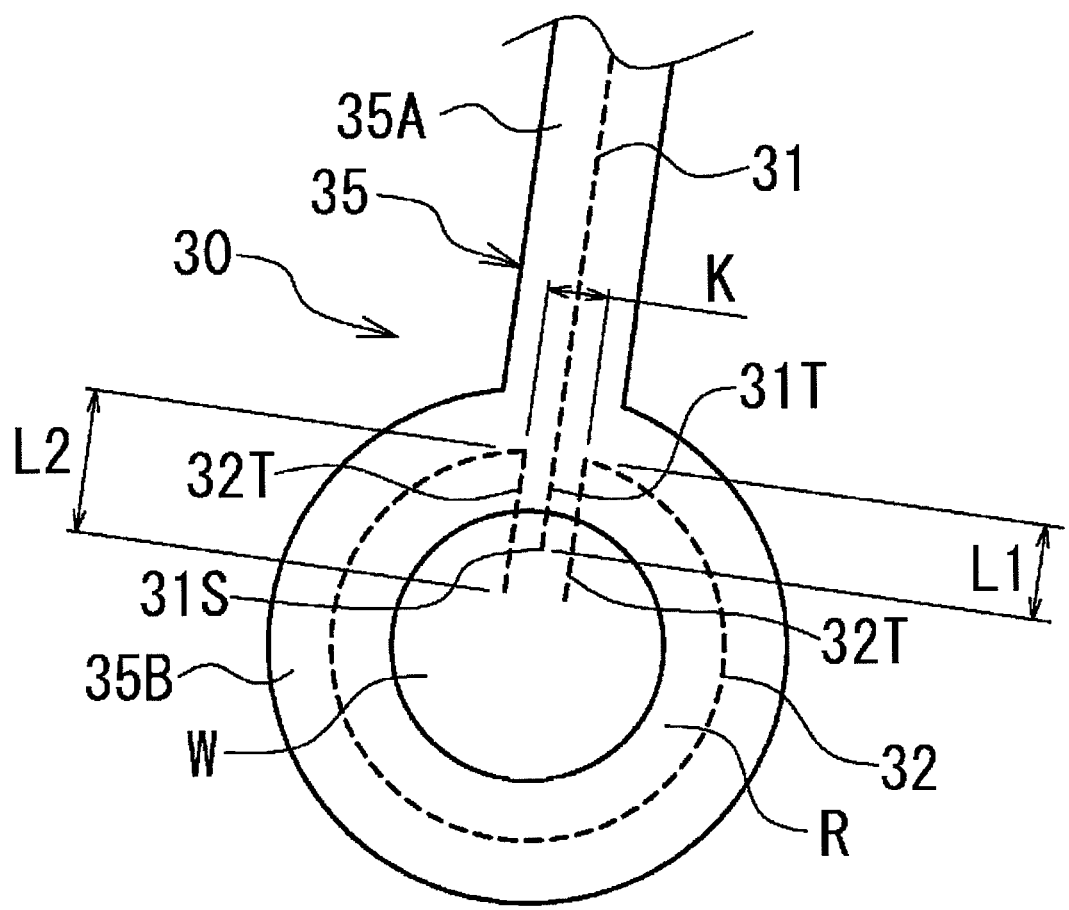
FIG. 2 is a partial enlarged schematic view showing an end of an inner connecting portion of the airbag.

FIG. 2 is a partial enlarged schematic view showing an end of the inner connecting portion 30, in which one end is extracted and shown.

As shown, the inner connecting portion 30 of this embodiment includes a first sewn portion 31 and a second sewn portion 32 (illustrated by dashed lines in the figure) at which the opposing base fabrics 20 and 21 are sewn together at predetermined positions of the air chamber 10; and an adhesive layer 35 formed along the first sewn portion 31 and the second sewn portion 32.

The first sewn portion 31 is formed in a linear shape extending in a predetermined direction in the air chamber 10 (see FIG. 1) and divides the air chamber 10 into regions on both sides thereof. The first sewn portion 31 is sewn continuously to the inside of the second sewn portion 32. The second sewn portion 32 is a substantially circular sewn portion surrounding an end 31T of the first sewn portion 31 to protect it. The second sewn portion 32 is sewn continuously in a substantially C-shape with the open end located near the first sewn portion 31 such that it does not intersect the first sewn portion 31, and a predetermined area, including a sewn end 31S of the end 31T, is located at a position surrounded by the second sewn portion 32. Furthermore, ends of the second sewn portion 32 disposed on both sides of the first sewn portion 31 (the opposing ends of the opening of the substantially C shape) are continuously sewn from the substantially C-shaped portion toward the inner side of the second sewn portion 32 along the end 31T of the first sewn portion 31 located inside the second sewn portion 32 at a predetermined distance on both sides, such that they do not intersect the first sewn portion 31.

In this manner, in this embodiment, a pair of opposing ends 32T formed in the second sewn portion 32 and the end 31T of the first sewn portion 31 are disposed in an inner region R of the second sewn portion 32, and a predetermined area of the end 31T of the first sewn portion 31 is disposed in parallel between the ends 32T of the second sewn portions 32. However, in this airbag 2, the ends 32T of the second sewn portion 32 is sewn such that they project toward the inner side of the second sewn portion 32 further than the end 31T of the first sewn portion 31, in the sewing direction. Thus, the length L2 of the ends 32T of the second sewn portion 32 is larger than the length L1 of the end 31T of the first sewn portion 31, and the entirety of the end 31T of the first sewn portion 31 surrounded by the second sewn portion 32 is disposed between the ends 32T of the second sewn portion 32 such that it is located therebetween.

The second sewn portion 32 is formed in an appropriate shape capable of surrounding the end 31T of the first sewn portion 31 according to the shape and position of the end 31T of the first sewn portion 31 in the air chamber 10, for example, a substantially circular shape, an oval shape, a substantially U-shape, and the like. Furthermore, the size (diameter) of the second sewn portion 32, the distance K between the ends 32T, and the lengths L1 and L2 of the ends 31T and 32T in the second sewn portion 32 are set in appropriately values such that the end 31T and the vicinity thereof can be properly protected according to the force applied to the end 31T and sewn end 31S of the first sewn portion 31 during inflation and deployment of the airbag 2. Herein, the ends 32T of the second sewn portion 32 are disposed on both sides of the end 31T of the first sewn portion 31, substantially parallel thereto and at the same distance therefrom. The distance K between the ends 32T is set to about 6 mm. Furthermore, the ends 32T of the second sewn portion 32, having a length L2 of about 15 mm, and the end 31T of the first sewn portion 31, having a length L1 of about 10 mm, are formed parallel to one another in straight-line shapes.

In addition, the inner connecting portion 30 has the adhesive layer 35 formed of an adhesive applied over a predetermined width along the sewing lines of the first and second sewn portions 31 and 32, with which the opposing base fabrics 20 and 21, including the sewn portions 31 and 32, are bonded together. This adhesive layer 35 is formed of, for example, a synthetic resin or a synthetic rubber having adhesiveness, sealing properties, and curability, such as silicone rubber, silicone resin, or epoxy resin, and serves as a sealing layer that seals the inner connecting portion (sewn portions 31 and 32) in an airtight manner. The adhesive layer 35 is formed by curing such that it is sandwiched between the base fabrics 20 and 21 or such that it also covers the front side thereof.

In this airbag 2, the adhesive layer 35 includes a linear portion 35A formed along the first sewn portion 31 of the inner connecting portion 30 and a circular portion 35B formed along the second sewn portion 32 provided at the end thereof in the air chamber 10, according to the shapes of the sewn portions 31 and 32. The linear portion 35A is formed in a substantially U-shape, L-shape, straight-line shape, or the like (see FIG. 1) along the first sewn portion 31 in the air chamber 10, and it bonds the base fabrics 20 and 21 together, across the first sewn portion 31, over a predetermined area to the vicinity of the end 31T. On the other hand, the circular portion 35B is formed along the second sewn portion 32 so as to surround the ends 32T thereof and the end 31T of the first sewn portion 31, and it bonds the base fabrics 20 and 21 together at the inside and outside of the second sewn portion 32, over the entirety in a circular shape.

In this manner, the adhesive layer 35 surrounds the entirety of the sewn portions 31 and 32 located in the bonding width (herein, substantially the central portion) and bonds the base fabrics 20 and 21 on both sides, including the sewn portions 31 and 32, together in the entirety of the air chamber 10. Furthermore, herein, the adhesive layer 35 is formed such that the linear portion 35A and the circular portion 35B are connected so as to fill the gap between the end 31T of the first sewn portion 31 and the ends 32T of the second sewn portions 32. Thus, a non-communicating portion W (non-bonded portion), which does not communicate with the air chamber 10, is provided in the circular portion 35B. As a result, portions of the ends 31T and 32T on the sewn-end side are disposed in the non-communicating portion W of the circular portion 35B, and portions continuous therewith are disposed in the circular portion 35B of the adhesive layers 35. In addition, in this airbag 2, the sewn portions 31 and 32 are formed by bonding the base fabrics 20 and 21 together using an adhesive in advance and by sewing the base fabrics 20 and 21 along the adhesive before or after the adhesive is cured. The inner connecting portion 30 is connected by sewing and with an adhesive, and the outer peripheral connecting portion 22 is also connected in the same way, and thus, the airbag 2 is formed in a predetermined shape that can be inflated and deployed.

The thus-configured airbag device 1 (see FIG. 1) is installed in a vehicle such that the airbag 2 folded in a predetermined state, together with the inflator and the like, is attached to and stored in the roof rail portion. Thereafter, the airbag device 1 activates the inflator to generate gas during a collision or the like of the vehicle and supplies the gas into the airbag 2 (air chamber 10). Thus, the air chamber 10 is inflated by the gas flowing therein, and the airbag 2 is unfolded, inflated and deployed downward of the vehicle in a curtain-like manner from the attaching tab 3 attached to the vehicle. In this manner, the airbag 2 is inflated and deployed between the occupant and the inner side wall of the vehicle, thereby receiving the incoming occupant by the inflated air chamber 10 and restraining the occupant to protect mainly the head thereof.

In the airbag 2 according to this embodiment, when the airbag 2 is inflated and deployed or entered by the occupant, it is possible to protect the end 31T of the first sewn portion 31, on which a large force is concentrated, and which is relatively likely to be broken, with the second sewn portion 32 surrounding the end 31T, and it is possible to reduce the concentration of force on the end 31T including the sewn end 31S. Furthermore, in this airbag 2, the ends 32T of the second sewn portion 32 are continuously sewn toward the inner side along the end 31T so as not to intersect the end 31T of the first sewn portion 31. Thus, the stitches do not overlap one another, and it is possible to prevent the sewing thread (in particular, the sewing thread of the first sewn portion 31) from being cut. As a result, the strength of portions at which the ends 31T and 32T of the sewn portions 31 and 32 oppose each other and the vicinity thereof against a force pulling the base fabrics 20 and 21 apart from each other is not decreased, and thus it is possible to prevent the sewn portions 31 and 32 from being broken from the vicinity thereof, and it is also possible to reduce the possibility of damage to the airbag 2 during inflation and deployment, without any further reinforcement.

Furthermore, in this airbag device 1, the ends 31T and 32T of the sewn portions 31 and 32 are all disposed in the substantially C-shaped second sewn portion 32. Therefore, it is possible to prevent a force pulling the base fabrics 20 and 21 apart from each other, caused by the inflation of the air chamber 10, from directly acting on the ends 31T and 32T. Accordingly, in addition to that the concentration of force on the vicinity of the ends 31T and 32T, as well as the breakage and damage of the airbag 2 starting from the ends 31T and 32T, can be more assuredly suppressed, the end 31T of the first sewn portion 31 can be assuredly protected by the ends 32T of the second sewn portion 32 from both sides at closer positions. At the same time, because the ends 32T of the second sewn portion 32 are continuously sewn toward the inner side along the first sewn portion 31, and the ends of the sewing thread are located in the inner region R surrounded by the second sewn portion 32, it is possible to reduce the influence exerted by the inflating air chamber 10 on the end of the sewing thread and to prevent a large force from acting in the vicinity thereof. Thus, the occurrence of the damage or the like can be further suppressed. In addition, because the ends 32T of the second sewn portion 32 may be sewn along the end 31T of the first sewn portion 31, sewing can be facilitated.

Moreover, because the sewing threads of the sewn portions 31 and 32 do not intersect each other, partial deterioration in flexibility due to overlapped threads can be suppressed. Thus, the airbag 2 can have sufficient flexibility. As a result, it is possible to fold the airbag 2 precisely and easily in a more compact form, and to make the folded state and shape thereof smaller.

Accordingly, in this embodiment, it is possible to prevent the sewing threads of the sewn portions 31 and 32 provided in the air chamber 10 of the airbag 2 from being cut during sewing, and it is possible to suppress damage to the airbag 2 starting from the ends 31T and 32T of the sewn portions 31 and 32. Thus, sewing can be facilitated while maintaining the flexibility of the airbag 2.

Furthermore, herein, the ends 32T of the second sewn portion 32 are disposed such that they project toward the inner side of the second sewn portion 32 further than the sewn end 31S of the first sewn portion 31, and the entirety of the end 31T is disposed between the ends 32T. Thus, the end 31T of the first sewn portion 31 is doubly surrounded and can be more firmly and assuredly protected. Because of this, even if the substantially C-shaped second sewn portion 32 or the circular portion 35B of the adhesive layer 35 is broken or damaged, allowing inside part of the second sewn portion 32 to be inflated, the force pulling the base fabrics 20 and 21 apart from each other acts rather on the ends 32T of the second sewn portion 32 than on the end 31T. Thus, even in such a case, it is possible to protect the end 31T of the first sewn portion 31 and to prevent occurrence of breakage. At the same time, because the end 31T and sewn end 31S of the first sewn portion 31 are located in a narrow region between the ends 32T of the second sewn portion 32, even if the surrounding portion is inflated, the amount of inflation thereof is small. Accordingly, the force acting on the end 31T of the first sewn portion 31 can be kept small, and thus, the breakage or the like can be effectively suppressed.

Herein, although the adhesive layer 35 is provided around the sewn portions 31 and 32 in this embodiment, the inner connecting portion 30 may be formed only of the sewn portions 31 and 32 without providing the adhesive layer 35. In such a case too, because the end 31T of the first sewn portion 31 is located in the second sewn portion 32 and between the ends 32T, the extent of inflation therearound and the diameter (size) of inflation are small when the airbag 2 is inflated and deployed, and accordingly, the force acting on the end 31T is also small. Furthermore, the ends 32T of the second sewn portion 32 are also located in the inner region R and can, in the same manner, prevent a large force from acting. Thus, it is possible to suppress damage to the airbag 2 starting from the ends 31T and 32T and to sufficiently achieve the above-described advantages.

However, when the adhesive layer 35 is provided, because the base fabrics 20 and 21 around the sewn portions 31 and 32 are bonded together and are less likely to be separated, a force acting on the sewn portions 31 and 32 during inflation and deployment of the airbag 2 can be further reduced. Thus, the sewn portions 31 and 32 can be protected, and gas leakage therefrom can be prevented. Because the damage to the airbag 2 starting from the sewn portions 31 and 32, including the ends 31T and 32T, can be further suppressed, it is more preferable that the inner connecting portion 30 be formed by sewing and with an adhesive. At this time, by forming the adhesive layer 35 so as to fill the gap between the end 31T of the first sewn portion 31 and the ends 32T of the second sewn portions 32, the gas can be prevented from entering and inflating the inner region R of the second sewn portions 32. As a result, the effect of protecting the ends 31T and 32T, as well as the effect of preventing breakage, is further increased. Thus, it is more preferable that the adhesive layer 35 be formed as such.

The ends 32T of the second sewn portion 32 may be sewn such that they are connected to each other in the inner region R.

Figure 3:
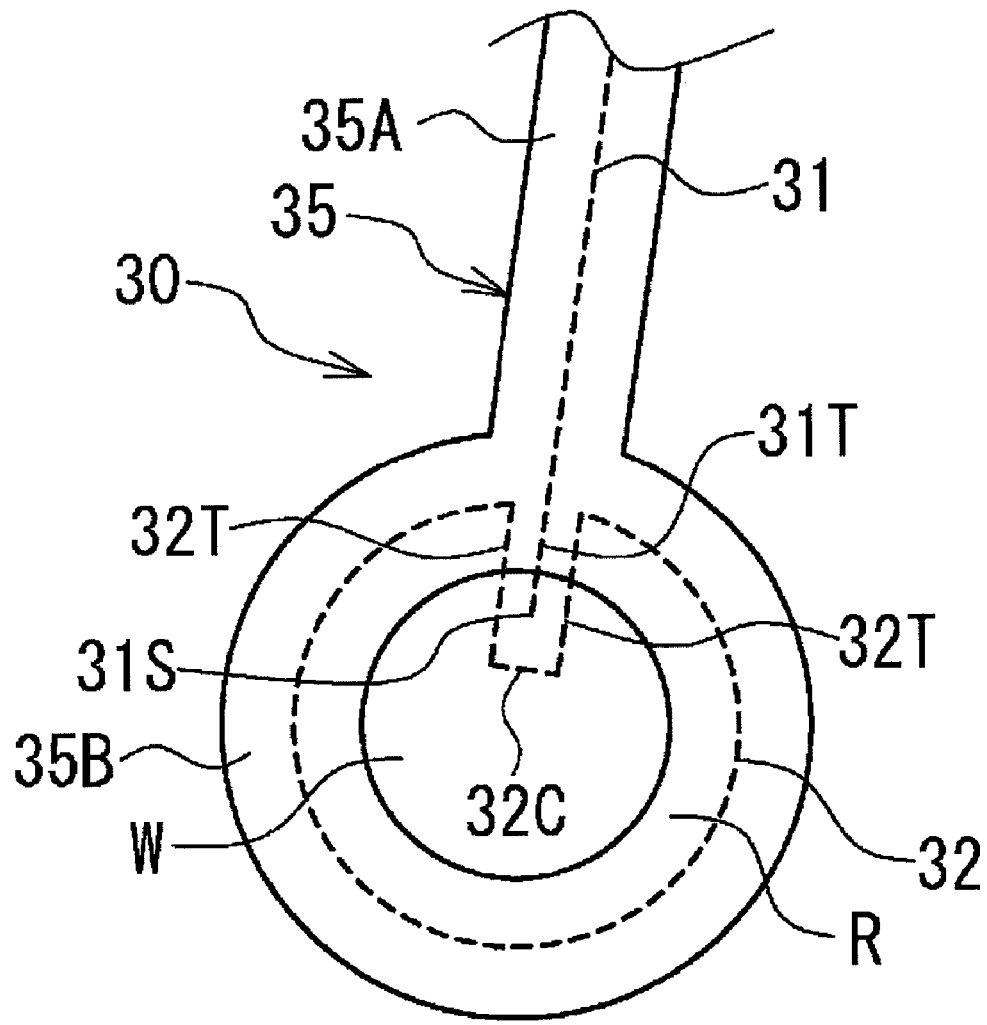
FIG. 3 is a partial enlarged schematic view showing an inner connecting portion in which ends of a second sewn portion are connected to each other.

FIG. 3 is a partial enlarged schematic view showing the inner connecting portion 30 in which the ends 32T are connected to each other.

Herein, as shown, one or both of the ends 32T of the second sewn portion 32 are bent at the projected end in the inner region R toward the projected end of the other end 32T and are continuously sewn so as to be connected to each other (a connecting portion 32C). In this manner, the ends 32T of the second sewn portion 32 are connected so as to surround the end 31T of the first sewn portion 31, and the end 31T of the first sewn portion 31, including the sewn end 31S, is located therein. By sewing the ends 32T of the second sewn portion 32 in this manner, the entire end 31T of the first sewn portion 31 can be surrounded and protected more firmly and assuredly. Furthermore, the amount of inflation therearound and the force acting on the end 31T is further reduced, whereby the damage to the airbag 2 can be effectively suppressed.

Although this embodiment has been described taking a side airbag device having the curtain-like airbag 2 as an example of the airbag device 1, the present invention may be applied to other airbags and airbag devices for, for example, driver's seats, passenger seats, and external airbag devices for protecting pedestrians, which have, similarly to the above, the airbag having the first sewn portion 31 in the air chamber 10, at which the opposing base fabrics 20 and 21 are sewn together.

REFERENCE SIGNS LIST

1: airbag device, 2: airbag, 3: attaching tab, 4: gas inlet, 10: air chamber, 11: front air chamber, 12: rear air chamber, 13: connecting portion, 20: front-side base fabric, 21: rear-side base fabric, 22: outer peripheral connecting portion, 30: inner connecting portion, 31: first sewn portion, 31T: end, 31S: sewn end, 32: second sewn portion, 32C: connecting portion, 32T: end, 35: adhesive layer, 35A: linear portion, 35B: circular portion, R: inner region.

The invention claimed is:

1. An airbag comprising:
an inflatable air chamber formed between opposing base fabrics; and
a plurality of first sewn portions, each creating a connection portion that divides the air chamber into a respective region, each connecting portion connecting the opposing base fabrics to each other,
wherein each first sewn portion has at opposite ends a second sewn portion surrounding an end of the first sewn portion so that the ends of the first sewn portion are protected when the airbag is inflated, and
wherein ends of the second sewn portion disposed on both sides of the first sewn portion are continuously sewn toward an inner side, along the end of the first sewn portion, without intersecting the first sewn portion.

2. The airbag according to claim 1,
wherein the ends of the second sewn portion are sewn such that they project toward the inner side of the second sewn portion further than a sewn end of the first sewn portion.

3. The airbag according to claim 2,
wherein the connecting portion has an adhesive layer that bonds the base fabrics to each other including the first and second sewn portions.

4. An airbag device comprising: the airbag according to claim 3; and an inflator that supplies gas to the airbag.

5. An airbag device comprising: the airbag according to claim 2; and an inflator that supplies gas to the airbag.

6. The airbag according to claim 1,
wherein the connecting portion has an adhesive layer that bonds the base fabrics to each other including the first and second sewn portions.

7. An airbag device comprising: the airbag according to claim 6; and an inflator that supplies gas to the airbag.

8. An airbag device comprising: the airbag according to claim 1; and an inflator that supplies gas to the airbag.

9. The airbag according to claim 1, wherein the second sewn portion has substantially a C-shape.

10. The airbag according to claim 1, wherein a length of ends of the second sewn portion is longer than a length of an end of the first sewn portion adjacent thereto.

11. An airbag comprising:
an inflatable air chamber formed between opposing base fabrics; and
a connecting portion formed in the air chamber, the connecting portion connecting the opposing base fabrics to each other,
wherein the connecting portion includes a first sewn portion that divides the air chamber formed by sewing the base fabrics together and a second sewn portion surrounding an end of the first sewn portion,
wherein ends of the second sewn portion disposed on both sides of the first sewn portion are continuously sewn toward the inner side, along an end of the first sewn portion, without intersecting the first sewn portion,
wherein the ends of the second sewn portion are sewn such that they project toward the inner side of the second sewn portion further than a sewn end of the first sewn portion, and
wherein the ends of the second sewn portion are connected so as to surround the end of the first sewn portion.

12. The airbag according to claim 11,
wherein the connecting portion has an adhesive layer that bonds the base fabrics to each other including the first and second sewn portions.

13. The airbag according to claim 12,
wherein the adhesive layer is formed so as to fill a gap between the end of the first sewn portion and the ends of the second sewn portion.

14. An airbag device comprising: the airbag according to claim 13; and an inflator that supplies gas to the airbag.

15. An airbag device comprising: the airbag according to claim 12; and an inflator that supplies gas to the airbag.

16. An airbag device comprising: the airbag according to claim 11; and an inflator that supplies gas to the airbag.

17. An airbag comprising:
an inflatable air chamber formed between opposing base fabrics; and
a connecting portion formed in the air chamber, the connecting portion connecting the opposing base fabrics to each other,
wherein the connecting portion includes a first sewn portion that divides the air chamber formed by sewing the base fabrics together and a second sewn portion surrounding an end of the first sewn portion, wherein ends of the second sewn portion disposed on both sides of the first sewn portion are continuously sewn toward the inner side, along an end of the first sewn portion, without intersecting the first sewn portion, wherein the connecting portion has an adhesive layer that bonds the base fabrics to each other including the first and second sewn portions, and wherein the adhesive layer is formed so as to fill a gap between the end of the first sewn portion and the ends of the second sewn portion.

18. An airbag device comprising: the airbag according to claim 17; and an inflator that supplies gas to the airbag.

19. An airbag comprising:

an inflatable air chamber formed between opposing base fabrics; and a connecting portion formed in the air chamber, the connecting portion connecting the opposing base fabrics to each other, wherein the connecting portion includes a first sewn portion that divides the air chamber formed by sewing the base fabrics together and a second sewn portion surrounding an end of the first sewn portion, wherein ends of the second sewn portion disposed on both sides of the first sewn portion are continuously sewn toward the inner side, along an end of the first sewn portion, without intersecting the first sewn portion, wherein the ends of the second sewn portion are sewn such that they project toward the inner side of the second sewn portion further than a sewn end of the first sewn portion, wherein the connecting portion has an adhesive layer that bonds the base fabrics to each other including the first and second sewn portions, and, wherein the adhesive layer is formed so as to fill a gap between the end of the first sewn portion and the ends of the second sewn portion.

20. An airbag device comprising: the airbag according to claim 19; and an inflator that supplies gas to the airbag.

* * * * *